United States Patent
Heo et al.

(10) Patent No.: US 9,315,215 B2
(45) Date of Patent: Apr. 19, 2016

(54) CENTER PILLAR OUTER AND MANUFACTURING METHOD THEREOF

(71) Applicant: Kia Motors Corporation, Seoul (KR)

(72) Inventors: Chul Hee Heo, Anyang-si (KR); Hee Dae Oh, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 14/532,888

(22) Filed: Nov. 4, 2014

(65) Prior Publication Data

US 2015/0175212 A1    Jun. 25, 2015

(30) Foreign Application Priority Data

Dec. 19, 2013   (KR) .................. 10-2013-0158991

(51) Int. Cl.
*B62D 25/04*    (2006.01)
*B21D 53/88*    (2006.01)
*B21D 22/02*    (2006.01)

(52) U.S. Cl.
CPC .............. *B62D 25/04* (2013.01); *B21D 53/88* (2013.01); *B21D 22/022* (2013.01); *Y10T 29/49622* (2015.01)

(58) Field of Classification Search
CPC ................................ B62D 25/04; B62D 27/02
USPC .................. 296/29, 187.03, 193.05, 193.06, 296/203.03; 29/897.2
See application file for complete search history.

(56) References Cited

U.S. PATENT DOCUMENTS

| | | | | |
|---|---|---|---|---|
| 5,246,264 A * | 9/1993 | Yoshii | ................. | B62D 25/04 296/1.03 |
| 8,651,562 B2 * | 2/2014 | Zornack | ............. | B62D 21/157 296/187.12 |
| 8,851,556 B2 * | 10/2014 | Nishimura | ............. | B62D 25/04 296/187.12 |
| 2008/0315628 A1 * | 12/2008 | Obayashi | ............... | B62D 25/04 296/193.06 |
| 2014/0152053 A1 * | 6/2014 | Watanabe | ............. | B62D 25/02 296/193.06 |
| 2015/0147111 A1 * | 5/2015 | Teague | ................. | B62D 25/04 403/271 |

FOREIGN PATENT DOCUMENTS

| | | |
|---|---|---|
| JP | 2001-163257 A | 6/2001 |
| JP | 2007-83828 A | 4/2007 |
| JP | 2009-001121 A | 1/2009 |
| JP | 2010-173403 A | 8/2010 |
| JP | 2011-088596 A | 5/2011 |
| KR | 10-0487670 B | 4/2005 |
| KR | 10-2012-0015625 A | 2/2012 |
| KR | 10-2013-0058276 A | 6/2013 |
| KR | 10-1328409 B1 | 11/2013 |
| WO | WO 2011151962 A1 * | 12/2011 ............. B62D 25/04 |

OTHER PUBLICATIONS

Japanese to English translation of WO 2011/151962; retreived Aug. 31, 2015 via Japanese Platform for Patent Information, located at https://www.j-platpat.inpit.go.jp/web/all/top/BTmTopEnglishPage.*

* cited by examiner

*Primary Examiner* — Jason S Daniels
(74) *Attorney, Agent, or Firm* — Morgan, Lewis & Bockius LLP

(57) ABSTRACT

A center pillar outer, and a method of manufacturing a center pillar outer, may include an upper panel portion which forms an upper end portion of the center pillar outer, and a lower panel portion which forms a lower end portion of the center pillar outer. The upper and lower panel portions are molded using different methods. A lower end of the upper panel portion and an upper end of the lower panel portion are overlapped with each other, and the overlapping portions are coupled to each other, for example, through welding.

9 Claims, 4 Drawing Sheets

CENTER PILLAR OUTER AND MANUFACTURING METHOD THEREOF

CROSS-REFERENCE TO RELATED APPLICATION

The present application claims priority of Korean Patent Application Number 10-2013-0158991 filed on Dec. 19, 2013, the entire contents of which application are incorporated herein for all purposes by this reference.

BACKGROUND OF INVENTION

1. Field of Invention

The present invention relates to a center pillar outer and a manufacturing method thereof which can improve side collision performance of a vehicle.

2. Description of Related Art

When a protruding portion of a barrier with a rigid body collides with a lower portion of a center pillar of a side body in a vehicle side collision test, a serious fracture occurs in the center pillar, based on a barrier hitting portion (a section of the center pillar, where the protruding portion of the barrier directly hits the center pillar).

In order to overcome such a serious fracture, a hot stamping method has been conventionally used in manufacturing of a panel component such as a center pillar. The hot stamping method is a method of producing a high-strength component by heating a material such as an iron plate at a high temperature, molding the heated material using a press and rapidly cooling the pressed material. The hot stamping method can produce a rigid and light component, as compared with the existing molding method of producing a panel component by pressing a material at a normal temperature.

FIG. 1 is a view schematically showing the structure of a side body to which a conventional center pillar outer for a vehicle is applied. As shown in FIG. 1, the center pillar outer 10 is attached between a side outer panel 210 and a side inner panel 220 of the vehicle, and a hinge bracket 20 for reinforcing the strength of a portion at which a door hinge is assembled with the center pillar outer 10 is attached to an inside of the center pillar outer 10.

When a one-piece type panel component such as the conventional center pillar outer 10 is, the component is locally softened by applying the hot stamping method in order to improve collision performance. Accordingly, one component having the same thickness has partially different strengths.

FIG. 2 is a view showing a conventional center pillar outer manufactured using a hot stamping method. The center pillar outer 10 shown in FIG. 2 is molded using the hot stamping method so that the strength of its lower end portion is relatively weakened as compared with that of its upper end portion. Conventionally, the center pillar outer 10 was used in a center pillar of a vehicle side body to guide deformation of the center pillar in the side collision of a vehicle, thereby preventing a fracture of the center pillar.

A mold for hot stamping is designed and used to manufacture a panel component such as a center pillar outer molded by being locally softened as described above. In this case, it takes a long time to develop the mold for hot stamping, and hence the mold investment cost (initial investment costs) for the mold is excessively increased. Since the durability of the mold is weak, spare molds are additionally required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a center pillar outer and a manufacturing method thereof, in which a component is implemented to have a predetermined strength and rigidity for each portion so that it can guide deformation of a center pillar in the side collision of a vehicle and to prevent a fracture of the center pillar, thereby optimizing the side collision performance of the vehicle.

In various aspects, the present invention provides a center pillar outer, including an upper panel portion configured to form an upper end portion of the center pillar outer and a lower panel portion configured to form a lower end portion of the center pillar outer, wherein the upper and lower panel portions are molded using different methods from each other, and wherein the upper and lower panel portions are integrally coupled to each other by bonding portions at which a lower end of the upper panel portion and an upper end of the lower panel portion are overlapped with each other.

In one aspect, the lower panel portion may have lower chamfers respectively formed between lower side portions and lower flanges at both left and right sides thereof, and each lower chamfer may be bonded to an upper chamfer of the upper panel portion.

In another aspect, upper flanges may be respectively formed at both left and right sides of the upper panel portion, and lower flanges may be respectively formed at both left and right sides of the lower panel portion. The lower flanges may be formed narrower than the upper flanges such that the lower flanges are not to be bonded between flanges of a side outer panel and a side inner panel but to be bonded to the respective upper flanges. The upper flanges may be interposed and bonded between the flanges of the side outer panel and the side inner panel.

In still another aspect, an inner surface of the upper panel portion and an outer surface of the lower panel portion may be bonded to each other in the overlapping portion at which the lower end of the upper panel portion and the upper end of the lower panel portion are overlapped with each other.

In yet another aspect, the upper panel portion may be molded using a hot stamping method. In still yet another aspect, the lower panel portion may be molded using a press-molding method.

In various other aspects, the present invention provides a method of manufacturing a center pillar outer, the method including a first process of manufacturing an upper end portion of the center pillar outer by molding the upper panel portion, a second process of manufacturing a lower end portion of the center pillar outer by molding the lower panel portion, using a method different from that of the upper panel portion, and a third process of manufacturing the center pillar outer by coupling the upper and lower panel portions to each other.

In an aspect, in the first process, the upper panel portion of the center pillar outer may be molded using a hot stamping method. In another aspect, in the second process, the lower panel portion of the center pillar outer may be molded using a press-molding method. In still another aspect, in the third process, a lower end of the upper panel portion and an upper end of the lower panel portion may be overlapped with each other, and the overlapping portions may be coupled to each other through welding.

As described above, the center pillar outer according to the present invention have advantages as follows. First, the upper and lower end portions of the center pillar outer can be respectively implemented to have optimum strengths, to flexibly deal with physical requirements for each portion of a component. Accordingly, it is possible to prevent a fracture caused by a physical impact applied to each portion of the component in the side collision of the vehicle. Second, it is possible to reduce cost consumed in developing and manufacturing a mold, as compared with the conventional center pillar outer. Third, an overlapping structure is formed at a portion where a door hinge is mounted so that it can remove the conventional hinge bracket. Accordingly, it is possible to reduce weight and cost.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
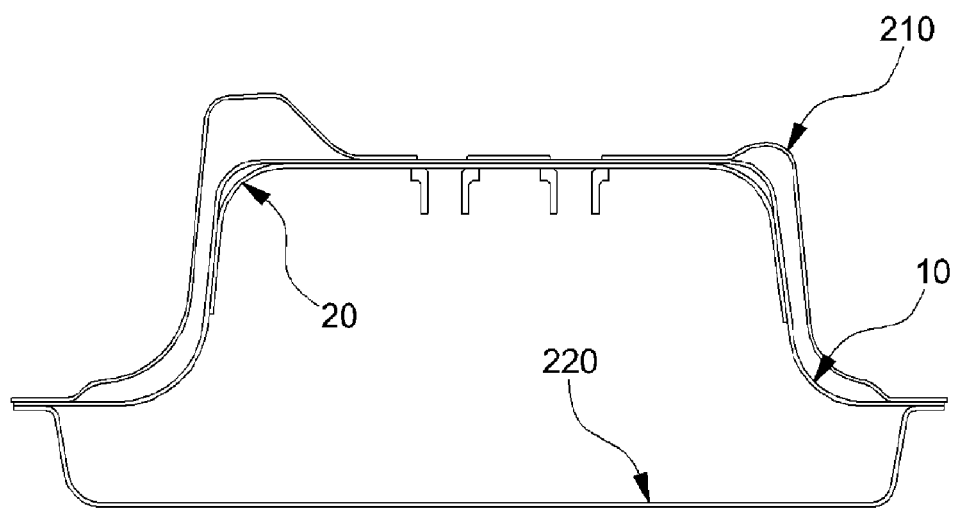
FIG. 1 is a view schematically showing the structure of a side body to which a conventional center pillar outer is attached.
Figure 2:
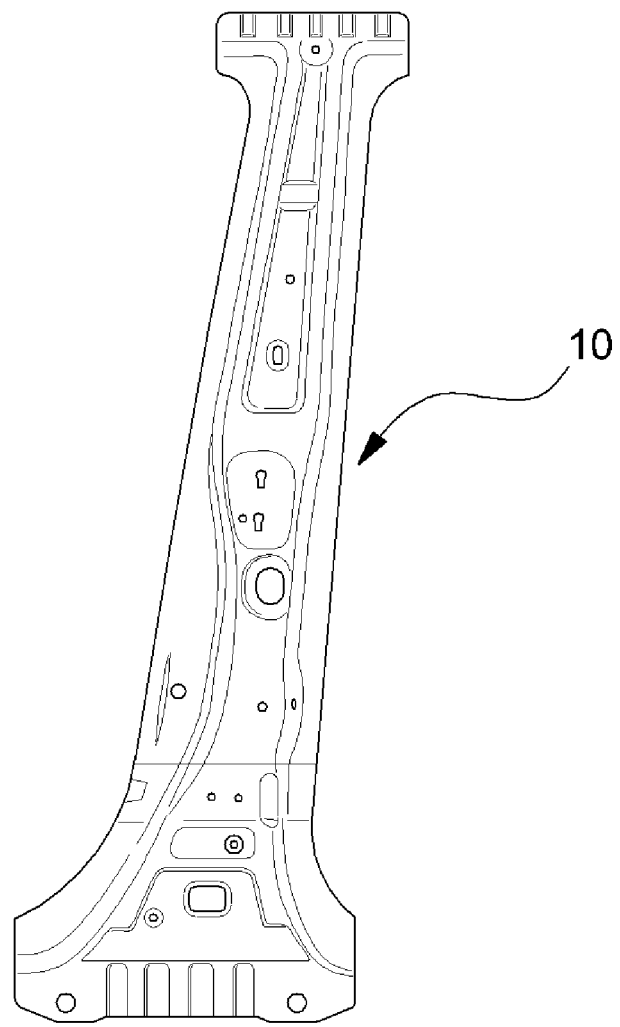
FIG. 2 is a view showing a conventional center pillar outer manufactured using a hot stamping method.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a panel component for improving side collision performance of a vehicle. In this case, the strength of the component for each portion is optimized so that it can guide deformation of the component in side collision of the vehicle and to prevent a fracture of the component.

Accordingly, in the present invention, an outer panel (center pillar outer) of a center pillar will be described. Here, the center pillar outer is a two-piece bonding panel component in which the strength of the component for each portion is optimized, and can be applied to a side body of a vehicle.

Figure 3:
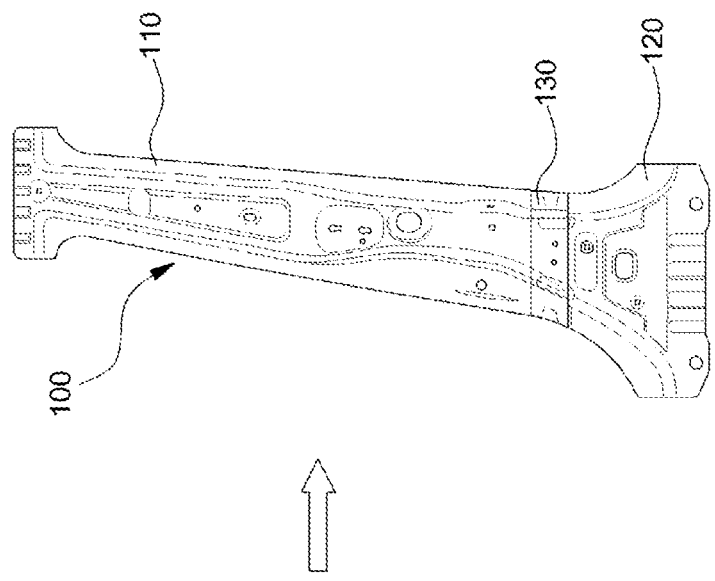
FIG. 3 is a view showing an exemplary center pillar outer according to the present invention.
Figure 3:
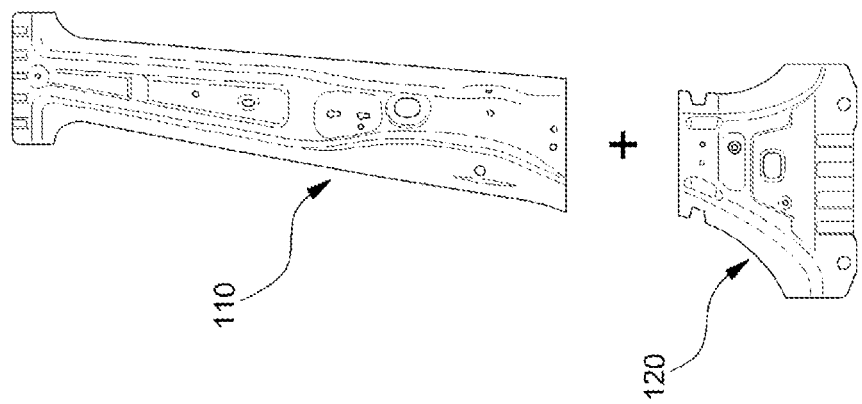
Figure 4:
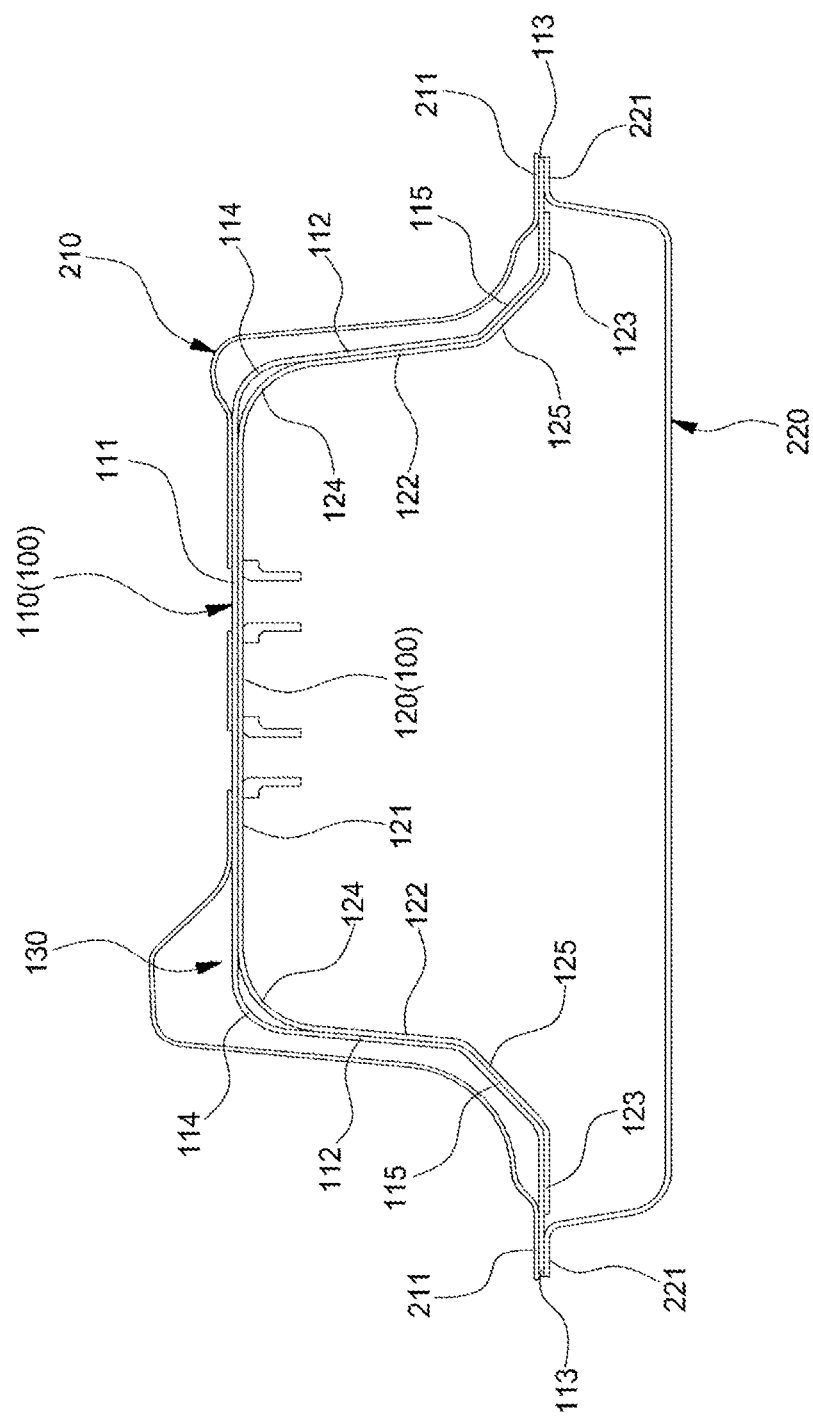
FIG. 4 is a view schematically showing the sectional structure of a side body to which an exemplary center pillar outer is attached according to the present invention.

FIG. 3 is a view showing a center pillar outer viewed from a front side according to various embodiments of the present invention. FIG. 4 is a view showing the sectional structure of a side body with which the center pillar outer is assembled, which is viewed from an overlapping portion, according to various embodiments of the present invention.

In the center pillar outer 100 according to various embodiments of the present invention, the strengths of its upper and lower end portions are separately optimized in order to prevent a fracture of a center pillar. As shown in FIGS. 3 and 4, the center pillar outer 100 includes an upper panel portion 110 which forms the upper end portion thereof, and a lower panel portion 120 which forms the lower end portion thereof.

Each of the upper and lower panel portions 110 and 120 is a panel component having an approximately 'ㄷ'-shaped sectional structure. The upper and lower panel portions 110 and 120 are integrally coupled to each other such as through welding, and portions of the upper and lower panel portions 110 and 120 are vertically overlapped with each other, thereby forming an overlapping portion 130. The upper and lower panel portions 110 and 120 are integrally coupled through bonding of the overlapping portion 130, thereby forming the center pillar outer 100.

Specifically, the center pillar outer 100 is integrally formed by bonding the overlapping portion 130 at which a lower end of the upper panel portion 110 and an upper end of the lower panel portion 120 are overlapped with each other. In the overlapping portion 130, an inner surface of the upper panel portion 110 and an outer surface of the lower panel portion 120 are bonded to each other.

In this case, the thicknesses of the upper and lower panel portions 110 and 120 may be separately formed in order to optimize the strengths of the upper and lower portions of the center pillar outer 100. That is, the upper and lower panel portions 110 and 120 may have different thicknesses in order to separately optimize the strengths thereof.

As shown in FIG. 4, the upper panel portion 110 includes a plate-shaped upper front portion 111, upper side portions 112 respectively extended from both left and right sides of the upper front portion 111, and upper flanges 113 respectively extended from end portions of the upper side portions 112.

A curve-shaped upper round portion 114 is integrally or monolithically formed between the upper front portion 111 and the upper side portion 112, and a plate-shaped upper chamfer 115 is integrally or monolithically formed between the upper side portion 112 and the upper flange 113.

The lower panel portion 120 includes a plate-shaped lower front portion 121, lower side portions 122 respectively extended from both left and right sides of the lower front portion 121, and lower flanges 123 respectively extended from end portions of the lower side portions 122.

A curve-shaped lower round portion 124 is integrally or monolithically formed between the lower front portion 121 and the lower side portion 122, and a plate-shaped lower chamfer 125 is integrally or monolithically formed between the lower side portion 122 and the lower flange 123.

In the overlapping portion 130 at which the upper and lower panel portions 110 and 120 are overlapped with each other, the upper and lower front portions 111 and 121 are bonded to each other, the upper and lower side portions 112 and 122 are bonded to each other, and the upper and lower flanges 113 and 123 are bonded to each other.

The upper and lower panel portions 110 and 120 are bonded to each other by respectively welding the chamfers 115 and 125 between the side portions 112 and 122 and the flanges 113 and 123 in the overlapping portion 130 so that it can improve the rigidity of the overlapping portion 130. Accordingly, it is possible to improve collision performance of the center pillar outer 100 and door hinge mounting performance.

As shown in FIG. 4, the upper and lower panel portions 120 are not bonded to each other at both the round portions 114 and 124 between the front portions 111 and 112 and the side portions 112 and 122.

Since the lower flange 123 is formed narrower than the upper flange 113, the lower flange 123 is not bonded between flanges 211 and 221 of a side outer panel 210 and a side inner panel 220, and is bonded to only the upper flange 113. The upper flange 113 is bonded between the flanges 211 and 221 of the side outer panel 210 and the side inner panel 220.

In other words, when the center pillar outer 100 is mounted between the side outer panel 210 and the side inner panel 220, only the upper flange 113 formed relatively wide is interposed and bonded between the flanges 211 and 221 of the side outer panel 210 and the side inner panel 220. The lower flange 123 is not interposed between the flanges 211 and 221 of the side outer panel 210 and the side inner panel 220, and is bonded to only the upper flange 113.

Accordingly, although a fracture occurs at the lower end portion of the center pillar outer 100 in the occurrence of side collision, it is possible to prevent the fracture from being transferred to the side panels (the side outer panel 210 and the side inner panel 220) at an edge (trim line) of the lower panel portion 120. In addition, the four-layer welding of the center pillar outer 100 and the side panels 210 and 220 is avoided so that it can ensure the welding quality of a coupling portion of the center pillar outer 100 (a portion at which the center pillar outer is coupled to the side panel).

Meanwhile, a manufacturing method of the center pillar outer 100 includes a first process of manufacturing an upper end portion of the center pillar outer 100 by molding an upper panel portion 110, a second process of manufacturing a lower end portion of the center pillar outer 100 by molding a lower panel portion 120, and a third process of manufacturing the center pillar outer 100 by coupling the upper and lower panel portions 110 and 120 to each other.

The upper panel portion 110 is an upper end portion which has a high strength (e.g., about 150 kgf) in the center pillar outer 100. The upper panel portion 110 is molded using a hot stamping method. The lower panel portion 120 is a lower end portion which has a relatively low strength (e.g., about 60 kgf) in the center pillar outer 100. The lower panel portion 120 is molded using a press-molding method. After the upper and lower panel portions 110 and 120 are separately molded, the molded upper and lower panel portions 110 and 120 are integrally coupled to each other through welding, thereby manufacturing the center pillar outer 100.

In this case, a lower end of the upper panel portion 110 and an upper end of the lower panel portion 120 are overlapped with each other, thereby forming an overlapping portion 130. In the overlapping portion 130, the upper and lower panel portions 110 and 120 are integrally bonded to each other.

The hot stamping method is a method of manufacturing a high-strength steel plate by press-molding and rapidly cooling a material heated at a high temperature to increase the strength of the material.

In the center pillar outer 100 according to the present invention, the upper panel portion 110 entirely having a high strength is molded using the hot stamping method, and the lower panel portion 120 entirely having a low strength is molded using the press-molding method. Thus, it is possible to decrease a cycle time and to reduce manufacturing cost, as compared with the conventional center pillar outer locally softened by applying the hot stamping method. In addition, it is possible to use a double die having a hot stamping mold and a press mold, thereby reducing molding cost.

In the center pillar outer 100 according to the present invention, the overlapping portion at which the upper and lower panel portions 110 and 120 are overlapped with each other substitutes for the existing hinge bracket for reinforcing the strength of a portion at which a door hinge is assembled with the conventional center pillar outer so that it can remove the conventional hinge bracket. Further, the upper panel portion 110 is molded using the hot stamping method so that it can improve moldability, thereby increasing the freedom degree of design.

For convenience in explanation and accurate definition in the appended claims, the terms "upper" or "lower", "left" or "right", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center pillar outer, comprising:
   an upper panel portion configured to form an upper end portion of the center pillar outer; and
   a lower panel portion configured to form a lower end portion of the center pillar outer,
   wherein the upper and lower panel portions are molded using different methods from each other,
   wherein the upper and lower panel portions are integrally coupled to each other by bonding portions at which a lower end of the upper panel portion and an upper end of the lower panel portion are overlapped with each other,
   wherein upper flanges are respectively formed at both left and right sides of the upper panel portion, and lower flanges are respectively formed at both left and right sides of the lower panel portion,
   wherein the lower flanges are formed narrower than the upper flanges such that the lower flanges are not to be bonded between flanges of a side outer panel and a side inner panel but to be bonded to the respective upper flanges, and
   wherein the upper flanges are interposed and bonded between the flanges of the side outer panel and the side inner panel.

2. The center pillar outer of claim 1, wherein the lower panel portion has lower chamfers respectively formed between lower side portions and lower flanges at both left and right sides thereof, and each lower chamfer is bonded to an upper chamfer of the upper panel portion.

3. The center pillar outer of claim 1, wherein an inner surface of the upper panel portion and an outer surface of the lower panel portion are bonded to each other in an overlapping portion at which the lower end of the upper panel portion and the upper end of the lower panel portion are overlapped with each other.

4. The center pillar outer of claim 1, wherein the upper panel portion is molded using a hot stamping method.

5. The center pillar outer of claim 1, wherein the lower panel portion is molded using a press-molding method.

6. A method of manufacturing a center pillar outer, the method comprising:
  a first process of manufacturing an upper end portion of the center pillar outer by molding an upper panel portion;
  a second process of manufacturing a lower end portion of the center pillar outer by molding a lower panel portion, using a method different from that of the upper panel portion; and
  a third process of manufacturing the center pillar outer by coupling the upper and lower panel portions to each other,
  wherein upper flanges are respectively formed at both left and right sides of the upper panel portion, and lower flanges are respectively formed at both left and right sides of the lower panel portion,
  wherein the lower flanges are formed narrower than the upper flanges such that the lower flanges are not to be bonded between flanges of a side outer panel and a side inner panel but to be bonded to the respective upper flanges, and
  wherein the upper flanges are interposed and bonded between the flanges of the side outer panel and the side inner panel.

7. The method of claim 6, wherein, in the first process, the upper panel portion of the center pillar outer is molded using a hot stamping method.

8. The method of claim 6, wherein, in the second process, the lower panel portion of the center pillar outer is molded using a press-molding method.

9. The method of claim 6, wherein, in the third process, a lower end of the upper panel portion and an upper end of the lower panel portion are overlapped with each other, and the overlapping portions are coupled to each other through welding.

* * * * *